Sept. 1, 1964
T. E. GILBERT ETAL
3,147,304
METHOD FOR HEAT RECOVERY IN UREA SYNTHESIS PROCESS
Filed June 21, 1960
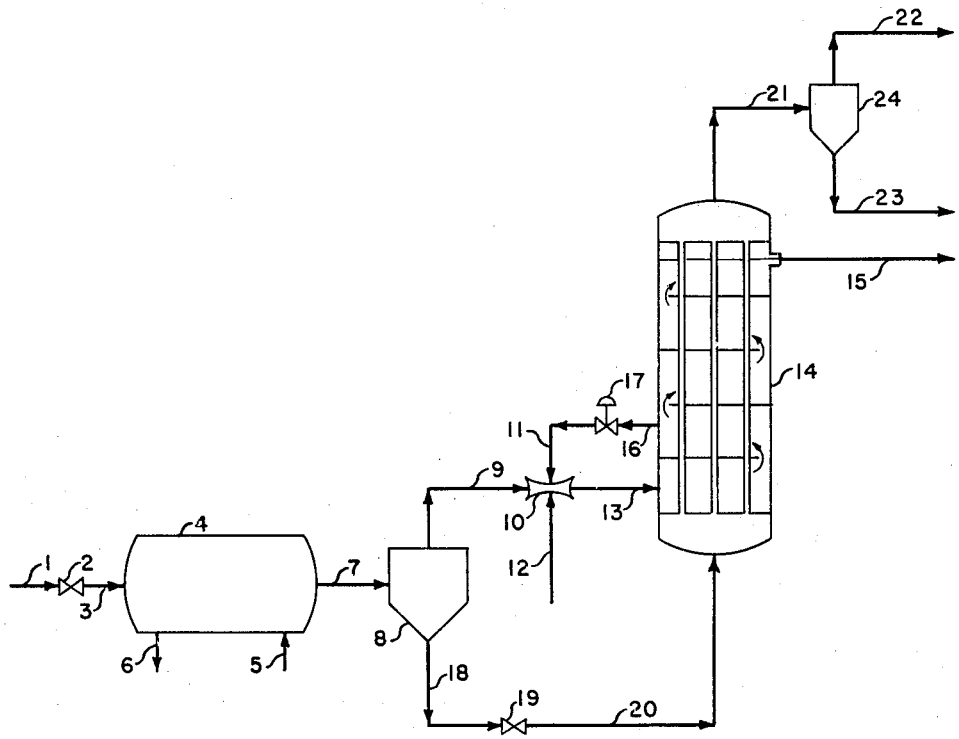
THOMAS E. GILBERT
LUCIEN H. COOK
INVENTORS
BY J. T. Chabot
AGENT United States Patent Office 3,147,304
Patented Sept. 1, 1964

3,147,304
METHOD FOR HEAT RECOVERY IN UREA
SYNTHESIS PROCESS
Thomas E. Gilbert, New York, and Lucien H. Cook, Port Washington, N.Y., assignors to Chemical Construction Corporation, New York, N.Y., a corporation of Delaware
Filed June 21, 1960, Ser. No. 37,641
6 Claims. (Cl. 260—555)

This invention relates to the synthesis of urea from ammonia and carbon dioxide, and concerns a method and apparatus for improved absorption of decomposer off-gas with greater heat recovery. The off-gas is moved with aqueous absorbent solution in an aspirator, and the resulting mixed gas-liquid stream is then passed into heat exchange means. Due to the improved mixing effect which is achieved by the method and apparatus of the present invention, higher initial mixture temperatures and improved heat recovery are achieved.

This invention provides an improvement which relates to the process described in U.S. patent application No. 8,009, filed February 11, 1960. However, the scope of the present invention broadly extends to any urea synthesis process in which an off-gas containing unreacted ammonia and carbon dioxide is produced. In a complete recycle urea process, this off-gas must be returned to the urea synthesis autoclave. In most instances the recycle is accomplished by absorbing the off-gas in an aqueous absorbent solution of ammonium carbamate or ammonium carbonate, and then recycling the resulting concentrated solution. The reactions involved in the absorption result in the generation and liberation of considerable heat, however, in most instances the heat as produced is wasted, since the resulting concentrated solution is simply cooled by means of heat exchange with cooling water prior to compression and recycle. The U.S. patent application cited supra provides a process wherein this heat is utilized to achieve final decomposition of ammonium carbamate in the second stage of a two-stage decomposition process.

In the present invention, a method and apparatus are presented whereby this heat is available at a much higher temperature level than formerly, and thus greater heat recovery may be achieved. In addition, the higher temperature level permits the usage of the heat for diverse purposes in urea synthesis processes such as for steam generation, in addition to usage in second stage ammonium carbamate decomposition. Since the heat is available at a higher temperature level, a more favorable temperature profile is possible in the heat exchanger, and consequently the transfer surface required and the size of unit necessary for a particular heat transfer capacity are reduced. Finally, the present invention includes a recycle liquid absorbent stream in a preferred embodiment, which makes it possible to moderate or adjust the absorption reaction and temperature level produced. This is highly important where process variations or upsets are encountered, since it conversely also permits the maintenance of uniform temperature regardless of such process upsets or variations.

In the prior art and in the U.S. patent application cited supra, the off gas stream and the aqueous liquid absorbent solution were passed simultaneously into heat exchange means such as the shell side of a shell and tube heat exchanger. In some prior art the off-gas is merely scrubbed with solution. In the present invention, it has been found highly advantageous to initially contact the off-gas with absorbent liquid in an aspirator. In general, this apparatus has a Venturi-type main passage, through which the gas is passed. The pressure reduction due to velocity increase in the throat of the passage provides a suction effect, whereby the liquid is passed into the gas stream. Use of the aspirator makes it possible to achieve rapid and fairly complete reaction between the gas and the liquid and thus to produce a high initial temperature in the resulting gas-liquid mixture. The resulting stream is then passed into heat exchange means, preferably the shell side of a vertical tube heat exchanger. A body of aqueous liquid solution is maintained in the shell side of the exchanger, with overflow liquid and undissolved gas phase removed from an upper shell exit. The balance of reaction between the gas stream and liquid thus takes place within the heat exchanger. In a preferred embodiment, a recycle liquid stream is removed from the heat exchanger and separately returned to the liquid suction inlet of the aspirator. Variation of this stream naturally permits variation in the operation and temperature level control in case of process upsets.

Thus in accordance with the present invention it becomes possible to achieve a higher initial mixed stream temperature, a better temperature profile in the heat exchanger, and more flexible control over the reaction. As a result, the method and apparatus of the present invention permits the heat exchanger section to be employed for other purposes besides providing second stage ammonium carbamate decomposition. The heat exchanger may be alternatively employed to generate steam or for other purposes in the urea synthesis process.

It is an object of the present invention to absorb urea process mixed off-gas in aqueous liquid absorbent solution.

Another object is to recover heat generated in the absorption of urea process mixed off-gas.

A further object is to provide a method and apparatus for more efficient absorption of off-gas in a urea synthesis process.

Still another object is to achieve maximum heat recovery in urea process mixed off-gas absorption.

An additional object is to produce a high temperature level by rapid mixing and reaction in the absorption of urea process off-gas.

Still a further object is to provide a flexible method and apparatus for absorption of urea process mixed off-gas with heat recovery, which is readily adjustable and conveniently modified to accommodate process variations and upsets.

These and other objects and advantages of the present invention will become evident from the description which follows. Referring to the figure, the high pressure effluent stream 1 from a urea synthesis autoclave not shown, is passed through pressure reducing valve 2. Stream 1 typically contains urea, water, ammonia and ammonium carbamate. The resulting stream 3 is passed at a pressure between about 200 p.s.i.g. to 400 p.s.i.g. through first stage ammonium carbamate decomposer 4, heated by means such as steam admitted via 5 with condensate removal via 6. The process stream is heated to a temperature preferably between about 240° F. to 320° F. in vessel 4, and a portion of the ammonium carbamate present is decomposed to free ammonia and carbon dioxide gas. The resulting mixed gas-liquid stream 7 is passed into separator vessel 8, wherein separation of gaseous and residual liquid phases is accomplished by cyclonic and gravity action.

A mixed off-gas stream containing ammonia, carbon dioxide and water vapor is thus removed from vessel 8 via 9 at a temperature usually between about 240° F. to 320° F. and pressure between about 200 p.s.i.g. to 400 p.s.i.g. Mixed gas stream 9 is now passed through the venturi passage of aspirator unit 10. Unit 10 provides a suction effect due to the internal gas flow configuration, typical units of similar configuration in steam heating or steam vacuum technology are known as steam spargers or steam ejectors. The suction effect of unit 10 is utilized to draw recycle liquid stream 11 and makeup liquid stream 12 into the unit, whereby a mixed gas-liquid stream is discharged via 13. A typical overall pressure drop of 40 p.s.i.g. is sustained by the gas stream in passing through unit 10.

As a result of the intimate mixing in unit 10, a portion of the gas stream is absorbed in the liquid phase and also part of the ammonia and carbon dioxide present are recombined to ammonium carbamate. These reactions are the opposite of those which occurred in unit 4 described supra, and it is thus evident that considerable heat is generated and liberated in stream 13. The hot mixed gas-liquid stream now passes into the shell section of heat exchanger 14, which is preferably of vertical tube configuration. A body of aqueous liquid absorbent solution is thus maintained within the shell section of exchanger 14, with upward flow of liquid and gas as indicated. A mixed stream of liquid and unabsorbed gas with reduced overall heat content is withdrawn via 15, preferably at a temperature between about 250° F. to 350° F. The aqueous liquid absorbent solution contemplated in the present invention comprises a solution containing water together with dissolved ammonia and carbon dioxide. The proportions of the solutes may vary, thus the solution may in actuality contain each of a mixture of ammonia, ammonium carbonate and ammonium carbamate. However, makeup stream 12 may consist either of water, aqua ammonia, or water containing both ammonia and carbon dioxide. In any case it is evident that under steady operating conditions the body of aqueous liquid absorbent in exchanger 14 will contain dissolved ammonia and carbon dioxide.

In a preferred embodiment of the present invention, a stream 16 of aqueous liquid absorbent solution is withdrawn from an intermediate level within exchanger 14, passed in a regulated amount through control valve 17, and subsequently recycled as stream 11 to aspirator 10. It is evident that, with other factors constant, adjustment of valve 17 provides a means of modifying the temperature levels and temperature gradient within exchanger 14. Similarly, it is evident that process upsets or variations may be compensated for by suitable adjustment of the setting of valve 17, so as to provide temperature uniformity within vessel 14.

Returning now to separator 8, the liquid phase consisting of aqueous urea product solution together with undecomposed ammonium carbamate and dissolved ammonia is withdrawn via 18. In a preferred embodiment of the present invention, stream 18 is passed through pressure reducing valve 19 and then conducted via line 20 at a pressure between about 5 p.s.i.g. to 50 p.s.i.g. and temperature between about 150° F. to 230° F. through the tubes of exchanger 14. Thus the undecomposed ammonium carbamate in stream 20 is fully decomposed within the tubes of exchanger 14 due to heat absorption from the liquid and gas contained in the shell of exchanger 14. The resulting mixed gas-liquid stream passes from the tubes section of exchanger 14 via 21 at a temperature between about 190° F. to 270° F. and is separated into off-gas phase 22 and liquid phase 23 in separator 24 which operates in a manner similar to separator 8 described supra. Stream 23 now consists of product aqueous urea solution, while off-gas stream 22 and mixed gas-liquid stream 15 are recycled to urea synthesis by other means not shown.

It should be noted that in some instances stream 12 derived from other sections of the urea synthesis process may be of sufficient magnitude to permit the substantial reduction or elimination of recycle stream 16. However, it is generally preferable to maintain the recycle flow rate of stream 11 at a value approximately 4 times as great as the rate of makeup stream 12. Other variations and modifications within the scope of the present invention will occur to those skilled in the art.

An example of a preferred embodiment of the present invention in an industrial application will now be described.

*Example*

An industrial urea synthesis facility was operated in accordance with the teaching of the present invention. The off-gas from the first stage of ammonium carbamate decomposition was recovered at 275 p.s.i.g. and 305° F. This gas stream analyzed, by weight, 35.6% carbon dioxide, 48.0% ammonia, 14.5% water vapor and 1.9% inerts, and had a density of 0.75 pound per cubic foot. Stream feed rate to the aspirator was 5426 pounds per hour. The total liquid feed rate to the suction inlet of the aspirator consisted of 10 g.p.m., made up of 8 g.p.m. of recycle liquor at 295° F. and 2 g.p.m. makeup aqua ammonia at 100° F. The mixed gas-liquid stream pressure downstream of the aspirator was 235 p.s.i.g., while the final gas-liquid stream drawoff from the shell side of the aspirator after heat exchange was at a pressure of 225 p.s.i.g. and temperature of 260° F.

Liquid feed to the tube side of the facility consisted of 4971 pounds per hour of liquid phase from the first stage decomposer separator. This liquid stream analyzed, by weight, 53% urea, 5.5% carbon dioxide, 11.5% ammonia and 30.0% water, and had a density of 50 pounds per cubic foot. The stream was fed to the tubes at 15 p.s.i.g. and 194° F. The mixed gas-liquid stream subsequently removed from the tubes at 235° F. was separated into 3461 pounds per hour of liquid analyzing, by weight, 73.4% urea, 24.0% water, 0.9% carbon dioxide and 1.7% ammonia, and 1510 pounds per hours of gas analyzing, by weight, 20.5% carbon dioxide, 37.6% ammonia and 41.9% water vapor.

Thus it is evident that application of the method and apparatus of the present invention readily produced a successful second stage decomposition in urea synthesis without steam consumption. It should be noted that the temperature level of gas absorption achieved by means of the present invention would readily permit the utilization of the facility for the production of steam rather than ammonium carbamate decomposition. Of course the second stage decomposition of ammonium carbamate is a preferred combination embodiment of the present invention.

We claim:

1. In a urea synthesis process comprising reacting ammonia and carbon dioxide at elevated pressure, reducing the pressure of the synthesis effluent stream to an intermediate level, heating said synthesis effluent stream to decompose a portion of the contained ammonium carbamate and produce a first off-gas containing ammonia and carbon dioxide, separating said first off-gas from the residual liquid effluent stream, reducing the pressure of said residual liquid effluent stream to a final lowered level, heating said residual liquid effluent stream to decompose residual ammonium carbamate and produce a second off-gas containing ammonia and carbon dioxide, and separating said second off-gas from the final liquid effluent stream comprising product aqueous urea solution, the improved method of heating said residual liquid effluent stream by absorption of said first off-gas in aqueous absorbent solution which comprises aspirating said aqueous absorbent solution into said first off-gas stream to provide initial gas-liquid mixing, passing the resulting mixed gas-liquid stream into aqueous solution at a pressure below said intermediate pressure level, said aqueous solution being contained in heat exchange means, and passing said residual liquid effluent stream in heat exchange with said aqueous solution in said heat exchange means, whereby final decomposition of ammonium carbamate in said residual liquid effluent stream is accomplished by absorption of heat from said aqueous solution.

2. Method of claim 1, in which a portion of said aqueous solution aspirated into said first off-gas stream consists of a recycle liquid stream derived from said aqueous solution contained in said heat exchange means.

3. In a urea synthesis process comprising reacting ammonia and carbon dioxide at elevated pressure, reducing the pressure of the synthesis effluent stream to an intermediate level in the range of 200 p.s.i.g. to 400 p.s.i.g., heating said synthesis effluent stream to a temperature in the range of 240° F. to 320° F. whereby a portion of the contained ammonium carbamate is decomposed and a first off-gas containing ammonia and carbon dioxide is produced, separating said first off-gas from the residual liquid effluent stream, reducing the pressure of said residual liquid effluent stream to a final lowered level in the range of 5 p.s.i.g. to 50 p.s.i.g., heating said residual liquid effluent stream whereby residual ammonium carbamate is decomposed and a second off-gas containing ammonia and carbon dioxide is produced, and separating said second off-gas from the final liquid effluent stream comprising product aqueous urea solution, the improved method of heating said residual liquid effluent stream by absorption of said first off-gas in aqueous absorbent solution which comprises aspirating said aqueous absorbent solution into said first off-gas stream to provide initial gas-liquid mixing, passing the resulting mixed gas-liquid stream into aqueous solution at a pressure about 40 p.s.i. below said intermediate pressure level, said aqueous solution being contained in heat exchange means, and passing said residual liquid effluent stream in heat exchange with said aqueous solution in said heat exchange means, whereby said residual liquid effluent stream is heated to a temperature in the range of 190° F. to 270° F. and final decomposition of ammonium carbamate in said residual liquid effluent stream is accomplished by absorption of heat from said aqueous solution, said aqueous solution being thereby cooled to a final temperature in the range of 250° F. to 350° F.

4. Method of claim 3, in which a portion of said aqueous solution aspirated into said first off-gas stream consists of a recycle liquid stream derived from said aqueous solution contained in said heat exchange means.

5. Method of claim 4, in which said recycle liquid stream derived from said aqueous solution contained in said heat exchange means constitutes about 80% of the total aqueous solution aspirated into said first off-gas stream.

6. In a urea synthesis process comprising reacting ammonia and carbon dioxide at elevated pressure, reducing the pressure and heating the synthesis effluent stream to decompose a portion of the contained ammonium carbamate and produce a first off-gas containing ammonia and carbon dioxide at a pressure of about 275 p.s.i.g. and temperature of about 305° F. and a residual liquid effluent stream containing product urea, heating said residual liquid effluent stream at reduced pressure to decompose residual ammonium carbamate and produce a second off-gas containing ammonia and carbon dioxide at a pressure of about 15 p.s.i.g. and a final liquid process stream consisting of product aqueous urea solution, the improved method of heating said residual liquid effluent stream and recovering heat by absorption of said first off-gas in aqueous absorbent solution which comprises aspirating said aqueous absorbent solution into said first off-gas to provide initial gas-liquid mixing, passing the resulting mixed gas-liquid stream at a pressure of about 235 p.s.i.g. into aqueous solution contained at a temperature of about 295° F. in heat exchange means, recycling a stream of aqueous solution from said heat exchange means to said aspiration step, said recycle stream of aqueous solution constituting about 80% of the total aqueous absorbent solution, recovering a final mixed gas-liquid stream of reduced heat content from said heat exchange means at a pressure of about 225 p.s.i.g. and a temperature of about 260° F., heating said residual liquid effluent stream in said heat exchange means from an initial temperature of about 194° F. to a final temperature of about 235° F. at said reduced pressure of about 15 p.s.i.g. by heat exchange with said aqueous solution, whereby ammonium carbamate in said residual liquid effluent stream is decomposed by absorption of heat from said aqueous solution and said second off-gas is produced.

References Cited in the file of this patent
UNITED STATES PATENTS

| | | |
|---|---|---|
| 1,475,113 | Grond | Nov. 20, 1923 |
| 1,649,345 | Gilmore | Nov. 15, 1927 |
| 1,898,093 | Miller | Feb. 21, 1933 |
| 1,937,116 | Hetherington | Nov. 28, 1933 |
| 2,744,133 | Cramer | May 1, 1956 |
| 3,038,285 | Marovic | June 12, 1962 |

FOREIGN PATENTS

| | | |
|---|---|---|
| 756,934 | Great Britain | Sept. 12, 1956 |

OTHER REFERENCES

Tonn: Chemical Engineering, vol. 62 (October 1955), pages 186–90.

Lauer et al.: Chemical Engineering Techniques (Reinhold, 1952), page 289.